United States Patent
Chun et al.

(10) Patent No.: US 9,094,952 B2
(45) Date of Patent: Jul. 28, 2015

(54) METHOD AND APPARATUS FOR ALLOCATING BANDWIDTH REQUEST CHANNEL IN WIRELESS COMMUNICATION SYSTEM INCLUDING RELAY STATION

(75) Inventors: Jin Young Chun, Gyeonggi-do (KR); Jin Sam Kwak, Gyeonggi-do (KR); Hee Jeong Cho, Gyeonggi-do (KR); Bin Chul Ihm, Gyeonggi-do (KR); Young Soo Yuk, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 141 days.

(21) Appl. No.: 13/883,359

(22) PCT Filed: Jun. 30, 2011

(86) PCT No.: PCT/KR2011/004790
§ 371 (c)(1),
(2), (4) Date: May 3, 2013

(87) PCT Pub. No.: WO2012/060533
PCT Pub. Date: May 10, 2012

(65) Prior Publication Data
US 2013/0223331 A1    Aug. 29, 2013

Related U.S. Application Data

(60) Provisional application No. 61/410,368, filed on Nov. 5, 2010.

(30) Foreign Application Priority Data

Apr. 22, 2011    (KR) .......................... 10-2011-0037684

(51) Int. Cl.
*H04W 72/04*    (2009.01)
*H04W 84/04*    (2009.01)

(52) U.S. Cl.
CPC .......... *H04W 72/04* (2013.01); *H04W 72/0406* (2013.01); *H04W 84/047* (2013.01)

(58) Field of Classification Search
None
See application file for complete search history.

(56) References Cited

U.S. PATENT DOCUMENTS

2006/0153132 A1*    7/2006    Saito .............................. 370/329
2006/0264172 A1*    11/2006    Izumikawa et al. .......... 455/11.1

(Continued)

FOREIGN PATENT DOCUMENTS

KR    10-2009-0074306 A    7/2009
WO    2009/084760 A1    7/2009

OTHER PUBLICATIONS

Samsung, "Clarifications on Ranging Opportunity Index in the AAI_HO_CMD message", Jul. 11, 2010.*
Search Report issued in corresponding International Patent Application No. PCT/KR2011/004790 dated Feb. 28, 2012.
Chun et al., "The Clarification of the Ranging and BR Channel for ARS (16.6.3)," IEEE 802.16 Broadband Wireless Access Working Group, IEEE C802.16m-10/1338r1, Nov. 9, 2010.

(Continued)

*Primary Examiner* — Ayaz Sheikh
*Assistant Examiner* — Tarell Hampton
(74) *Attorney, Agent, or Firm* — Morgan, Lewis & Bockius LLP

(57) ABSTRACT

A method and apparatus of allocating a bandwidth request channel (BRCH) in a wireless communication system including a relay station (RS) is provided. At least one first BRCH for a bandwidth request of a mobile station (MS) connected to a base station (BS) and at least one second BRCH for a bandwidth request of the RS are allocated. An opportunity index is assigned to each of the at least one first BRCH and the at least one second BRCH, and the opportunity index assigned to the at least one second BRCH is started after the opportunity index assigned to the at least one first BRCH.

16 Claims, 13 Drawing Sheets

(56) References Cited

U.S. PATENT DOCUMENTS

2007/0153746 A1  7/2007  Lee et al.
2009/0011784 A1  1/2009  Kang et al.
2011/0064019 A1  3/2011  Chun et al.

OTHER PUBLICATIONS

Office Action issued in counterpart Japanese Patent Application No. 2013-536487 dated Feb. 13, 2014.

* cited by examiner

METHOD AND APPARATUS FOR ALLOCATING BANDWIDTH REQUEST CHANNEL IN WIRELESS COMMUNICATION SYSTEM INCLUDING RELAY STATION

TECHNICAL FIELD

The present invention relates to wireless communication and, more particularly, to a method and apparatus for allocating a bandwidth request channel in a wireless communication system including a relay station.

BACKGROUND ART

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

A wireless communication system including a Relay Station (RS) is recently being developed. The RS functions to expand the cell coverage and to improve transmission performance. An effect that the cell coverage can be obtained when a base station (BS) provides services to a mobile station (MS), placed at the coverage boundary of the BS, through the RS. Furthermore, the transmission capacity can be increased when the RS improves transmission reliability of a signal between the BS and the MS. Although the MS exists within the coverage of the BS, the RS may be used when the MS is placed in a shadow region.

A frame configuration of a system into which an RS has been introduced may be different from a frame configuration of a system into which an RS has not been introduced. Part of the frame may be used for only communication between a BS and an MS or between an RS and an MS. Part of the frame may be used for communication between a BS and an RS.

A bandwidth request channel (BRCH) may be allocated in uplink (UL). The BRCH is used to request radio resources for sending UL data or a control signal by an MS. Furthermore, in a system into which an RS has been introduced, BRCHs may be allocated to not only an MS, but also an RS in order to request radio resources from a BS.

There is a method of efficiently allocating BRCHs for an RS in a system into which an RS has been introduced.

SUMMARY OF INVENTION

Technical Problem

The present invention provides a method and apparatus for allocating BRCHs in a wireless communication system including an RS.

Technical Solution

In an aspect, a method of allocating a bandwidth request channel (BRCH) in a wireless communication system including a relay station (RS) is provided. The method includes allocating at least one first BRCH for a bandwidth request of a mobile station (MS) connected to a base station (BS) and at least one second BRCH for a bandwidth request of the RS, wherein an opportunity index is assigned to each of the at least one first BRCH and the at least one second BRCH, and the opportunity index assigned to the at least one second BRCH is started after the opportunity index assigned to the at least one first BRCH.

The at least one first BRCH may be allocated to a uplink (UL) access zone used by the RS in order to receive a signal from the MS, and the at least one second BRCH may be allocated to a UL relay zone used by the RS in order to send a signal to the BS.

A total number of the at least one first BRCH and the at least one second BRCH may be 4.

The opportunity index assigned to each of the first BRCH and the second BRCH may be any one of 0 to 3, and the opportunity indices assigned to the first BRCH and the second BRCH may do not overlap with each other.

The at least one second BRCH may be allocated according to an RS configuration command message transmitted through media access control (MAC).

The RS configuration command message may indicate the number and positions of UL subframes to which the at least one second BRCH is allocated.

At least one second BRCH may be allocated from a first UL subframe or a second UL subframe of a UL relay zone.

The RS configuration command message may indicate an index of a distributed resource unit (DRU) in which the at least one second BRCH is allocated within a frequency partition.

The at least one first BRCH may be allocated by a secondary superframe header (S-SFH) SP3.

In another aspect, a method of sending a bandwidth request signal by a relay station (RS) in a wireless communication system is provided. The method includes receiving an RS configuration command message from a base station (BS), and sending the bandwidth request signal to the BS through at least one RS BRCH, allocated for the bandwidth request of the RS, based on the RS configuration command message, wherein the at least one RS BRCH is allocated to a UL relay zone within a frame, used by the RS in order to send a signal to the BS, an opportunity index is allocated to the at least one RS BRCH, and the opportunity index allocated to the at least one RS BRCH is started after an opportunity index of at least one MS BRCH allocated to a UL access zone for a bandwidth request of an MS connected to the BS.

A total number of the at least one RS BRCH and the at least one MS BRCH may be 4.

The opportunity index assigned to each of the RS BRCH and the MS BRCH may be any one of 0 to 3, and the opportunity indices assigned to the RS BRCH and the MS BRCH may do not overlap with each other.

The at least one RS BRCH may be allocated according to an RS configuration command message transmitted through MAC.

The RS configuration command message may indicate the number and positions of UL subframes to which the at least one RS BRCH is allocated.

The RS configuration command message may indicate an index of a DRU in which the at least one RS BRCH is allocated within a frequency partition.

The at least one MS BRCH may be allocated by an S-SFH SP3.

In another aspect, a relay station (RS) in a wireless communication system is provided. The RS includes a radio frequency (RF) unit configured to send or receive a radio signal, and a processor connected to the RF unit, wherein the processor is configured to receive an RS configuration command message from a BS, and send a bandwidth request signal to the BS through at least one RS BRCH, allocated for the bandwidth request of the RS, based on the RS configuration command message, wherein the at least one RS BRCH is allocated to a UL relay zone within a frame, used by the RS in order to send a signal to the BS, an opportunity index is allocated to the at least one RS BRCH, and the opportunity index allocated to the at least one RS BRCH is started after an opportunity index of at least one MS BRCH allocated to a UL access zone for a bandwidth request of an MS connected to the BS.

Advantageous Effects

Contention-based BRCHs can be efficiently allocated in a wireless communication system into which an RS has been introduced.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the IEEE 802.16m. However, technical features of the present invention are not limited thereto.

Figure 1:
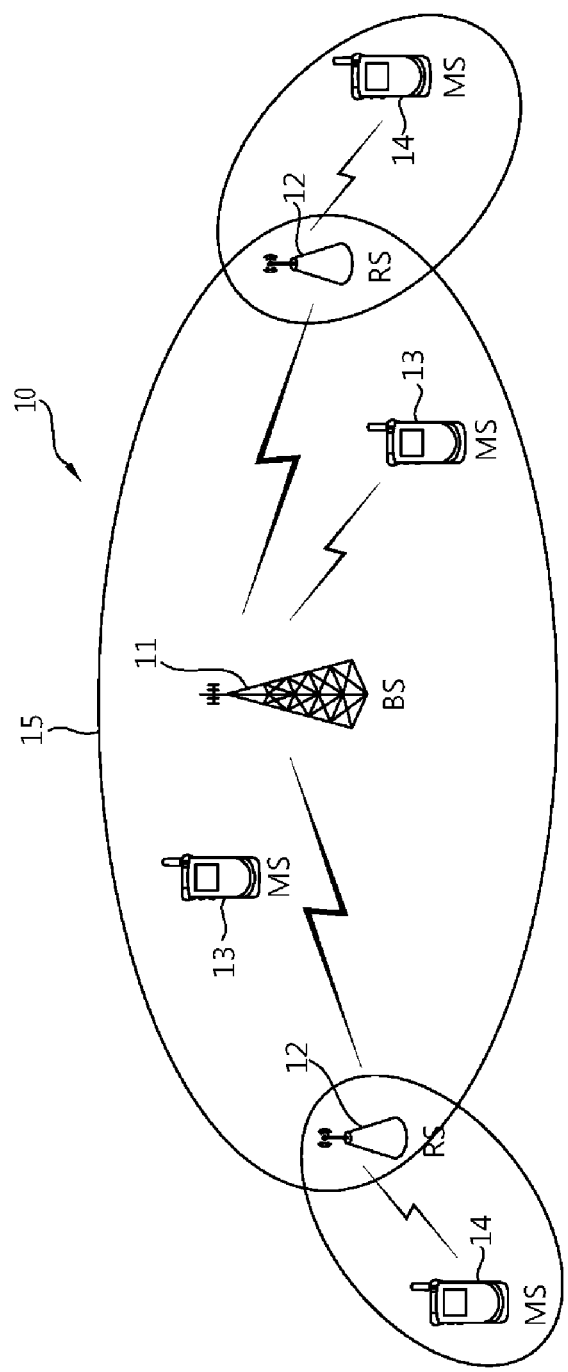
FIG. 1 illustrates a wireless communication system including a relay station.

FIG. 1 illustrates a wireless communication system including a relay station.

Referring to FIG. 1, a wireless communication system 10 including a relay station includes at least one base station (BS) 11. Each base station 11 provides communication service over a specific geographical zone 15 called a cell. The cell may be divided into a plurality of regions, and each of the regions is referred to as a sector. A single base station may have one or more cells. In general, the base station 11 means a fixed station communicating with a mobile station 13, and may be referred to as other terms such as an evolved NodeB (eNB), a Base Transceiver System (BTS), an access point, an Access Network (AN), an advanced BS (ABS), or the like. The base station 11 may perform functions such as connectivity, management, control, and resource assignment between a relay station 12 and a mobile station 14.

The relay station (RS) 12 means a device that relays (repeats) a signal between the base station 11 and the mobile station 14, and may be referred to as other terms such as a Relay Node (RN), a repeater, an advanced RS (ARS) and the and the like. As a relay scheme used by the relay station, any method such as Amplify and Forward (AF), Decode and Forward (DF) and the like may be used, and the technical aspect of the present invention is not limited thereto.

The mobile stations (MS) 13 and 14 may be fixed or have mobility, and may be referred to as other terms such as an advance Mobile Station (AMS), a User Terminal (UT), a Subscriber Station (SS), a wireless device, a Personal Digital Assistant (PDA), a wireless modem, a handheld device, user equipment, and the like. Hereinafter, a macro mobile station is a mobile station that directly communicates with a base station, and a relay mobile station denotes a mobile station that communications with a relay station. The macro mobile station 13, even when being within a cell of the base station 11, may communicate with the base station 11 via the relay station 12 in order to enhance transmission speed according to diversity effects.

A mobile station normally belongs to a single cell, and this cell to which the mobile station belongs is called a serving cell. A base station providing communication service over the serving cell is called a serving BS. Since a wireless communication system is a cellular system, another cell adjacent to the serving cell is present, and this is referred to as a neighbor cell. A base station providing communication service over the neighbor cell is referred to as a neighbor BS. The serving cell and the neighbor cell are determined relatively with respect to the mobile station.

This technique may be used in a downlink (DL) and an uplink (UL). Between a base station and a mobile station, the downlink means communication from the base station to a macro mobile station, and the uplink means communication from the macro mobile station to the base station. Between a base station and a relay station, the downlink means communication from the base station to the relay station, and the uplink means communication from the relay station to the base station. Between a relay station and a relay mobile station, the downlink means communication from the relay station to the relay mobile station, and the uplink means communication from the relay mobile station to the relay station. In the downlink, a transmitter may be part of the base station or the relay station, and a receiver may be part of the mobile station or the relay station. In the uplink, a transmitter may be part of the mobile station or the relay station, and a receiver may be part of the base station or the relay station.

Figure 2:
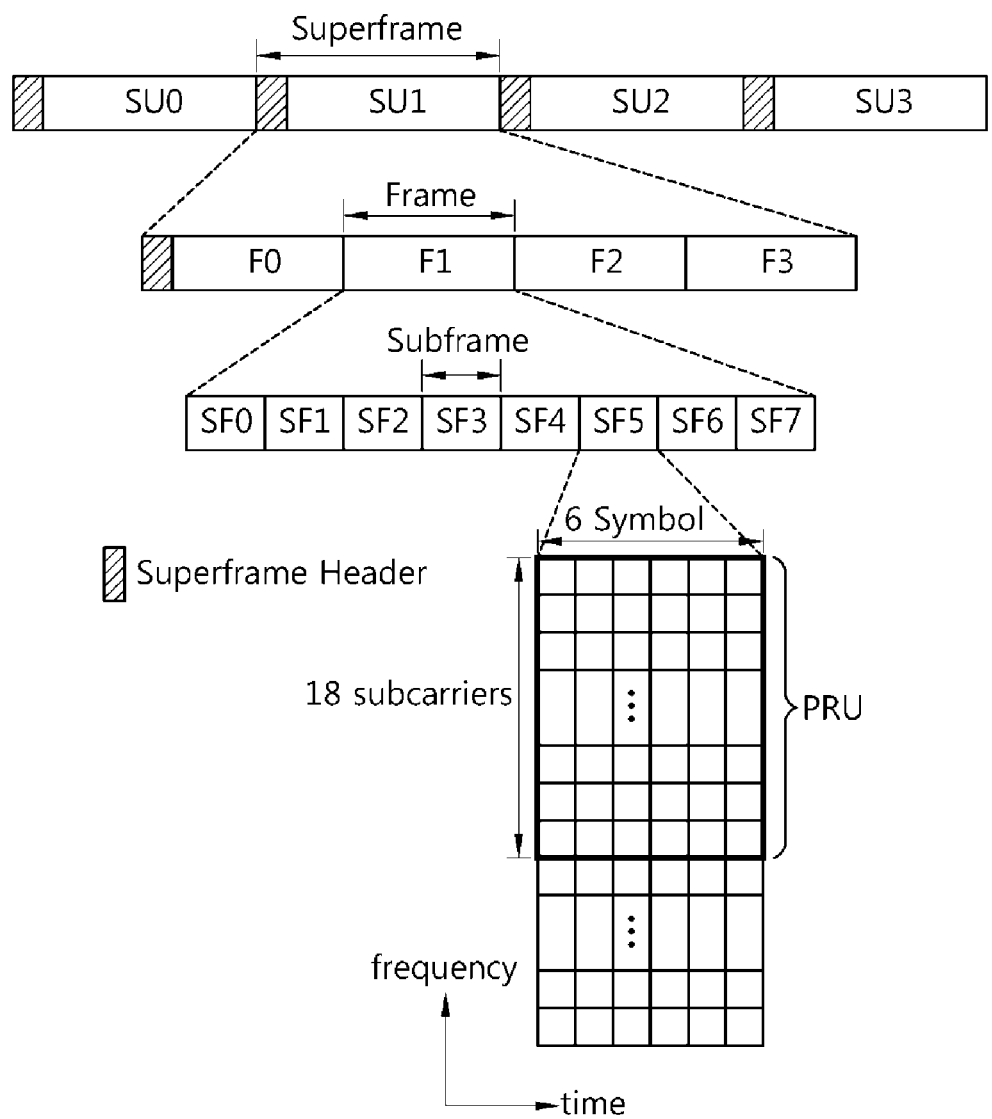
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplex (TDD) or frequency division duplex (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A superframe header (SFH) can carry an essential system parameter and system configuration information. The SFH may be located in a first subframe of a superframe. The SFH may occupy last 5 OFDMA symbols of the first subframe. The SFH can be classified into a primary-SFH (P-SFH) and a secondary-SFH (S-SFH). The P-SFH and the S-SFH can be transmitted in every superframe. Information transmitted on the S-SFH can be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP1 may be transmitted with period of 40 ms. The S-SFH SP2 includes information on initial network entry and network discovery. The S-SFH SP2 may be transmitted with period of 80 ms. The S-SFH SP3 includes other important system information. The S-SFH SP1 may be transmitted with period of either 160 ms or 320 ms.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| | | | | | | | |
|---|---|---|---|---|---|---|---|
| Channel bandwidth, BW(MHz) | | | 5 | 7 | 8.75 | 10 | 20 |
| Sampling factor, n | | | 28/25 | 8/7 | 8/7 | 28/25 | 28/25 |
| Sampling frequency, Fs(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf(kHz) | | | 10.94 | 7.81 | 9.77 | 10.94 | 10.94 |
| Useful symbol time, Tb(μs) | | | 91.4 | 128 | 102.4 | 91.4 | 91.4 |
| G = 1/8 | Symbol time, Ts(μs) | | 102.857 | 144 | 115.2 | 102.857 | 102.857 |
| | FDD | Number of OFDMA symbols per 5 ms frame | 48 | 34 | 43 | 48 | 48 |
| | | Idle time(μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG(μs) | 165.714 | 248 | 161.6 | 165.714 | 165.714 |

TABLE 1-continued

| | | | | | | | |
|---|---|---|---|---|---|---|---|
| $G = 1/16$ | | Symbol time, Ts(μs) | 97.143 | 136 | 108.8 | 97.143 | 97.143 |
| | FDD | Number of OFDMA symbols per 5 ms frame | 51 | 36 | 45 | 51 | 51 |
| | | Idle time(μs) | 45.71 | 104 | 104 | 45.71 | 45.71 |
| | TDD | Number of OFDMA symbols per 5 ms frame | 50 | 35 | 44 | 50 | 50 |
| | | TTG + RTG(μs) | 142.853 | 240 | 212.8 | 142.853 | 142.853 |
| $G = 1/4$ | | Symbol time, Ts(μs) | 114.286 | 160 | 128 | 114.286 | 114.286 |
| | FDD | Number of OFDMA symbols per 5 ms frame | 43 | 31 | 39 | 43 | 43 |
| | | Idle time(μs) | 85.694 | 40 | 8 | 85.694 | 85.694 |
| | TDD | Number of OFDMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | | Left | 40 | 80 | 80 | 80 | 160 |
| | | Right | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s = \text{floor}(n \cdot BW/8000) \times 8000$. A subcarrier spacing is defined as $\Delta f = F_s/N_{FFT}$. A useful symbol time is defined as $Tb = 1/\Delta f$. A CP time is defined as $Tg = G \cdot Tb$. An OFDMA symbol time is defined as $Ts = Tb + Tg$. A sampling time is defined as $Tb/N_{FFT}$.

Figure 3:
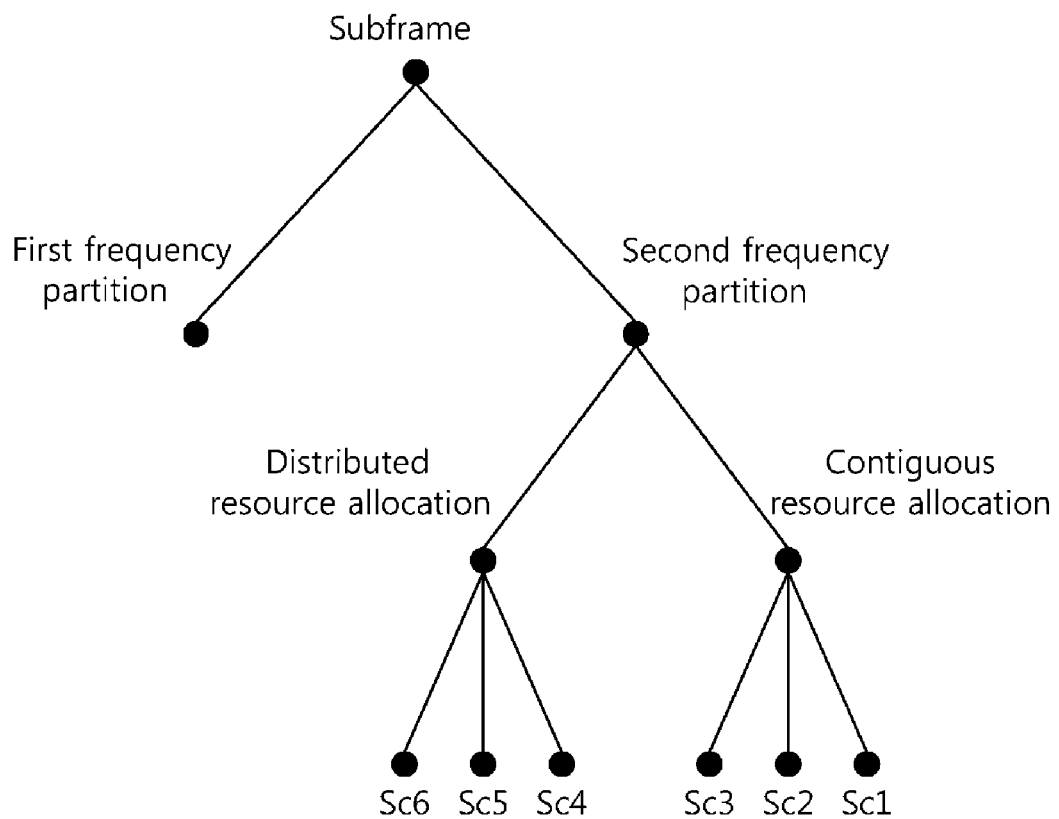
FIG. 3 shows an example of an uplink radio resource.

FIG. 3 shows an example of an uplink radio resource.

Each uplink subframe can be divided into 4 or less frequency partitions. Although a subframe is divided into two frequency partitions (i.e., FP1 and FP2) in FIG. 3, this is for exemplary purposes only, and thus the number of frequency partitions in the subframe is not limited thereto. Each frequency partition consists of at least one physical resource unit (PRU) across all available orthogonal frequency division multiple access (OFDMA) symbols in the subframe. In addition, each frequency partition may include contiguous/localized and/or distributed PRUs. Each frequency partition may be used for other purposes such as fractional frequency reuse (FFR). The second frequency partition (i.e., FP2) of FIG. 3 includes both contiguous resource allocation and distributed resource allocation. 'Sc' denotes a subcarrier.

The PRU is a basic physical unit for resource allocation, and includes Psc contiguous subcarriers and Nsym contiguous OFDMA symbols. Psc may be 18. Nsym may be determined according to a subframe type. For example, when one subframe consists of 6 OFDMA symbols, the PRU can be defined with 18 subcarriers and 6 OFDMA symbols. A logical resource unit (LRU) is a basic logical unit for distributed and contiguous resource allocations. The LRU size for control channel transmission should be same as for data transmission. Multiple users are allowed to share one control LRU.

A distributed logical resource unit (DLRU) can be used to obtain a frequency diversity gain. A DLRU may consist of subcarriers included in 3 tiles distributed in one frequency partition. The tile is a basic unit of constituting the uplink DLRU. The tile can be defined 6 subcarriers and Nsym OFDMA symbol.

A contiguous logical resource unit (CLRU) can be used to obtain a frequency selective scheduling gain. The CLRU includes a group of contiguous subcarriers in a resource allocated in a localized manner. The CLRU consists of a data subcarrier in a contiguous resource unit (CRU). The CRU has the same size as the PRU.

Hereinafter, the wireless communication system adopting a relay station will be described. A relay station may be introduced to an IEEE 802.16m system. A mobile station may be connected to a base station or the relay station, and receive service from the connected base station or relay station.

In an IEEE 802.16m system, relaying may be performed by a DF paradigm. In the downlink and the uplink, both FDD and TDD schemes may be supported. A relay station may operate in a time-division-transmit and receive (TTR) mode or a simultaneous transmit and receive (STR) mode. In the TTR mode, access communication between the relay station and a mobile station and relay link communication between a base station and the relay station in a single radio frequency (RF) carrier wave are multiplexed by a time division multiplexing (TDM) scheme. In the STR mode, if an access link and a relay link are sufficiently independent, the access link communication and the relay link communication can be synchronously carried out.

In an IEEE 802.16m system, a relay station operates in a non-transparent mode. In the non-transparent mode, relation stations form SFH and A-MAP for subordinate stations, and transmit A-preamble, SFH and A-MAP to the subordinate stations.

An IEEE 802.16m system adopting a relay station may utilize a distribution scheduling model in which each base station or relay station schedules radio resources for a subordinate link. In the case of the relay station, resource scheduling is performed within resources allocated from the base station. The base station may inform the relay station and a mobile station of the configuration of a frame structure. A radio frame may be divided into an access zone and a relay zone.

In the access zone, the base station and the relay station transmit signals to the mobile station or receive signals from the mobile station. In the relay zone, the base station transmits signals to the relay station (and the mobile station), or receives signals from the relay station (and the mobile station). The frame structure of the base station and the relay station may be aligned in time. The base station and the relay station may synchronously transmit A-preamble, SFH and A-MAP to the mobile station.

Figure 4:
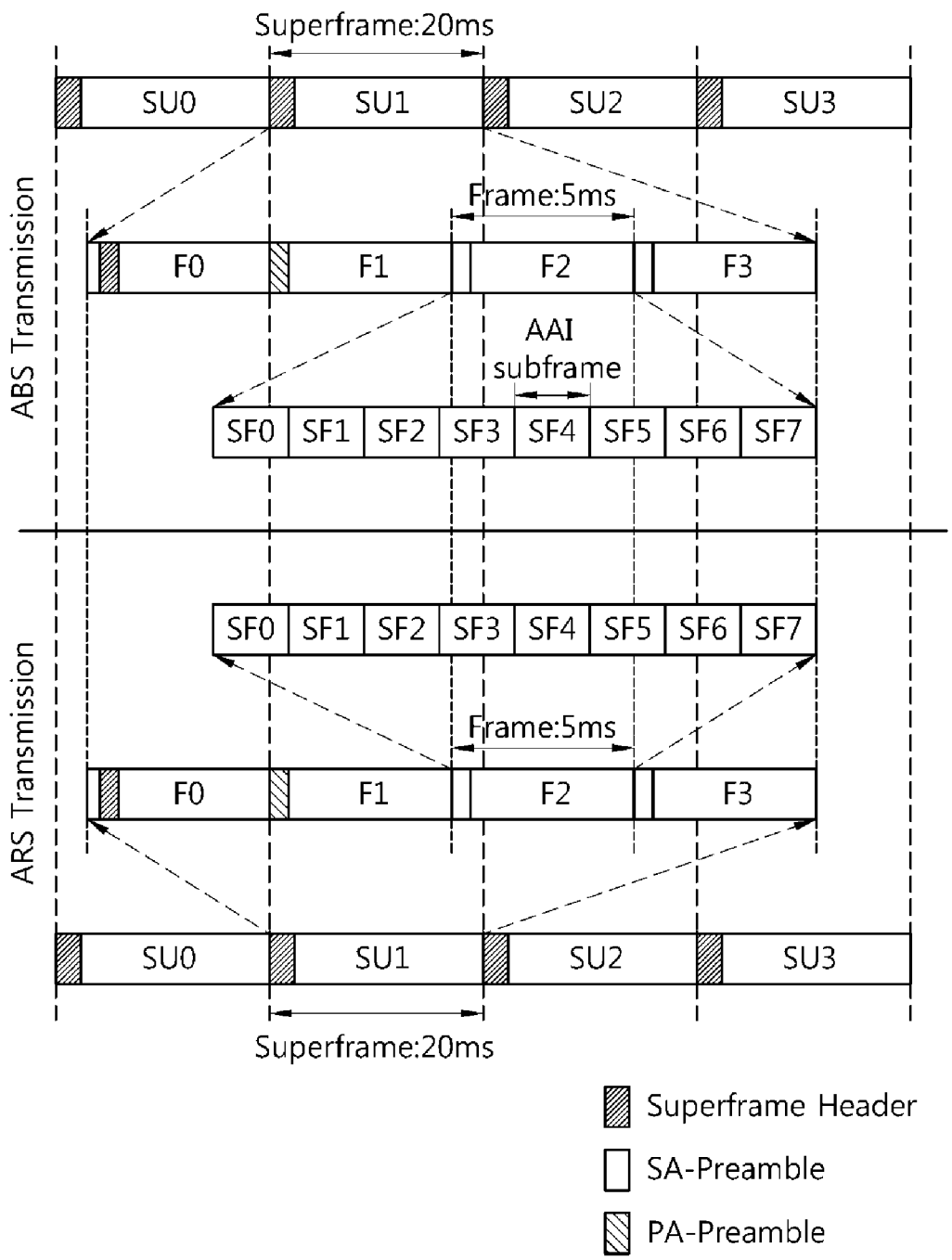
FIG. 4 shows an example of a basic frame configuration of a system supporting an RS.

FIG. 4 shows an example of a basic frame configuration of a system supporting an RS.

Like a BS, a system into which an RS has been introduced may use OFDMA parameters shown in Table 1 without change. The superframes (SU) of a BS and an MS are aligned in time, and they may include the same number of frames (F)

and subframes (SF). Each superframe of an RS includes a SFH. An SFH transmitted by an RS has the same position and format as an SFH transmitted by a BS. RS preambles (SA-preamble and PA-preamble) are transmitted synchronously with a superordinate BS preamble.

In a system supporting an RS, a BS frame may be divided into an access zone and a relay zone. The access zone may be placed ahead of the relay zone within a TDD frame and an FDD DL frame. The relay zone may be placed ahead of the access zone within an FDD UL frame. The access zone and the relay zone may have different durations in DL and UL.

The access zone of a BS frame consists of a DL access zone and a UL access zone, and the relay zone thereof consists of a DL relay zone and a UL relay zone. The access zone of a BS frame is used to communicate with only an MS. The relay zone of the BS frame may be used to communicate with an RS or an MS. An MS served by a BS not an RS can transmit or receive data according to the existing frame configuration into which an RS has not been introduced, irrespective of the access zone or the relay zone. However, if the access zone and the relay zone use different permutations, the MS cannot communicate with a BS through the relay zone. In the DL relay zone, a BS transmits a signal to a subordinate RS. In the UL relay zone, a BS receives a signal from a subordinate RS.

The access zone of the RS frame consists of a DL access zone and a UL access zone, and the relay zone thereof consists of a DL relay zone and a UL relay zone. The access zone of the RS frame is used to communicate with only an MS. In the DL relay zone, an RS receives a signal from a superordinate BS. In the UL relay zone, an RS transmits a signal to a superordinate BS.

A configuration of the DL/UL access zones and DL/UL relay zones within a frame may be determined when an RS or an MS receives a frame configuration index through a S-SFH SP1. A configuration of DL/UL access zones and DL/UL relay zones within a frame may be determined through a broadcast message, such as an AAI_SCD message or an AAI_ARS_CONFIG_CMD message. Some frame configuration defined for basic communication between a BS and an MS may not be supported in a system into which an RS has been introduced. Furthermore, a frame configuration supporting an MS operating in the IEEE 802.16e system may not be supported in a system into which an RS has been introduced.

In each RS frame, a relay transmit to receive transition interval (R-TTI) may be inserted. The R-TTI may be inserted for an ARS transmit/receive transition gap (ARSTTG) and round-trip delay (RTD) between an RS and a superordinate station. Furthermore, in each RS frame, a relay receive to transmit transition interval (R-RTI) may be inserted. The R-RTI may be inserted for an ARS receive/transmit transition gap (ARSRTG) and RTD between an RS and a superordinate station.

Figure 5:
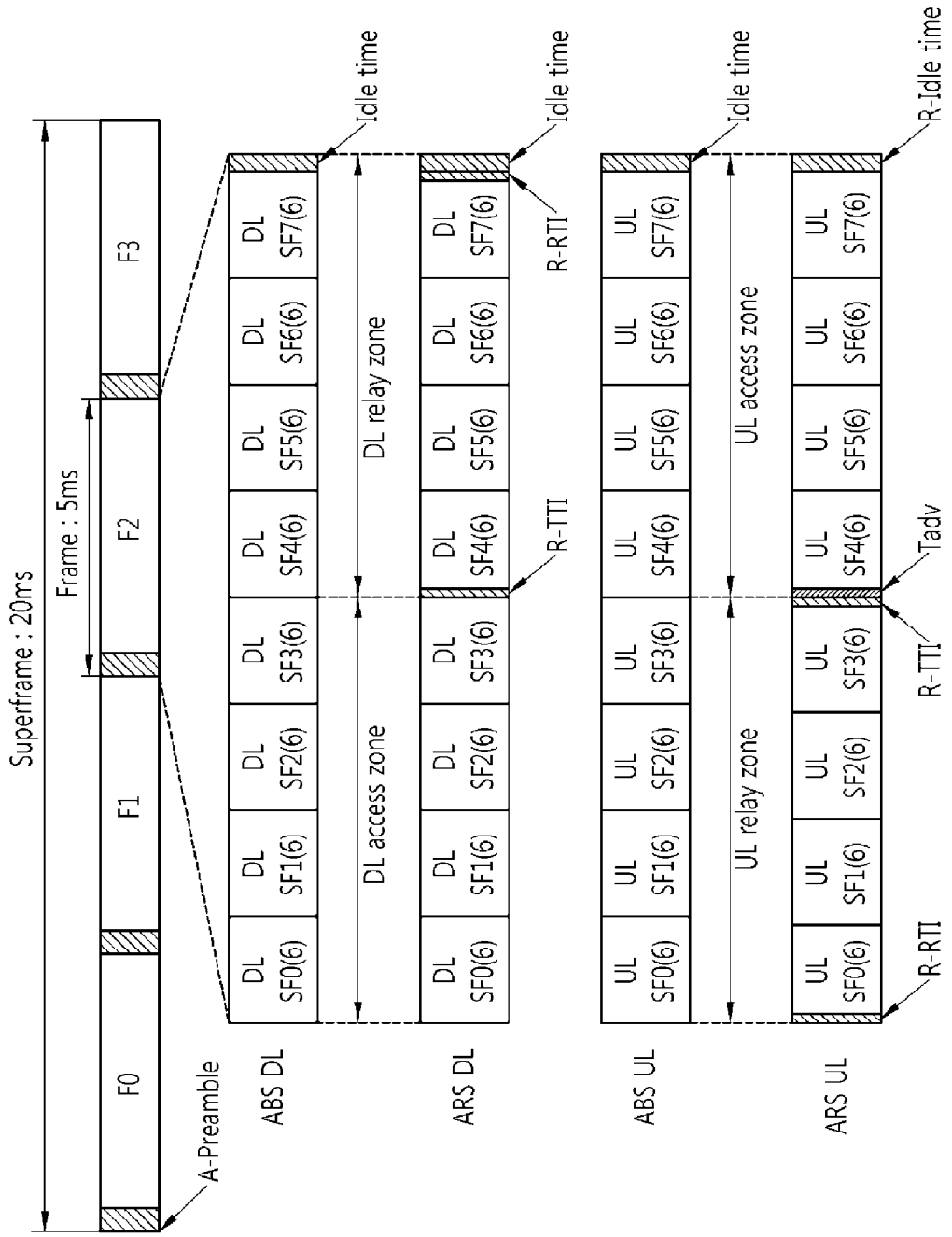
FIG. 5 shows an example of an FDD frame configuration of a system supporting an RS.

FIG. 5 shows an example of an FDD frame configuration of a system supporting an RS.

FIG. 5 shows an example of an FDD frame configuration applicable when a nominal channel bandwidth is 5 MHz, 10 MHz, or 20 MHz and G=1/8. The RS of an FDD system uses a DL carrier frequency in order to receive a signal from a BS in the DL relay zone and uses a UL carrier frequency in order to send a signal to a BS in the UL relay zone.

Referring to FIG. 5, an idle state time interval R_IdleTime may be inserted between RS radio frames. The length of the idle state time interval R_IdleTime may be transmitted from an RS to MSs through a system configuration descriptor message (or AAI_SCD (System Configuration Descriptor) message). In the RS DL frame, the length of the idle state time interval R_IdleTime is identical with the idle time IdleTime of a BS. In the RS UL frame, the length of the idle state time interval R_IdleTime may be identical with or smaller than the IdleTime of a BS. The length of the idle state time interval R_IdleTime may be signalized from an RS to an MS through the AAI_SCD message. The RS UL frame may be temporally placed ahead of the BS UL frame by Tadv. Tadv may be calculated by subtracting the idle state time interval R_IdleTime from the idle time IdleTime.

A transition gap may be inserted when an RS changes the state of a transceiver from a transmission state to a reception state or from a reception state to a transmission state. Referring to FIG. 5, in the RS DL frame, an R-TTI is inserted between the access zone and the relay zone, and an R-RTI is inserted between the relay zone and the access zone of a next RS DL frame. The R-TTI may be placed at the last OFDMA symbol of a last subframe of the access zone. The R-RTI may be placed at the last OFDMA symbol of a last subframe of the relay zone. The length of the R-TTI may be 0 when RTD/2≥ARSTTG and may be Ts when RTD/2<ARSTTG. Here, RTD is round trip delay between an RS and a superordinate station. The length of the R-RTI may be 0 when IdleTime-RTD/2≥ARSRTG and may be Ts when IdleTime-RTD/2<ARSRTG.

A subframe SF3 into which the R-TTI has been inserted includes 5 OFDMA symbols. Accordingly, the operation of an MS may be influenced. If the R-TTI is not inserted, a subframe within the DL access zone of an RS is the same as a subframe within the DL access zone of a BS.

Furthermore, in the RS UL frame, the R-RTI is inserted between the access zone and the relay zone, and the R-TTI is inserted between the relay zone and the access zone of a next RS DL frame. The R-RTI may be placed at the first OFDMA symbol of a first subframe of the relay zone, and the R-RTI may be placed at the last OFDMA symbol of a last subframe of the relay zone.

Figure 6:
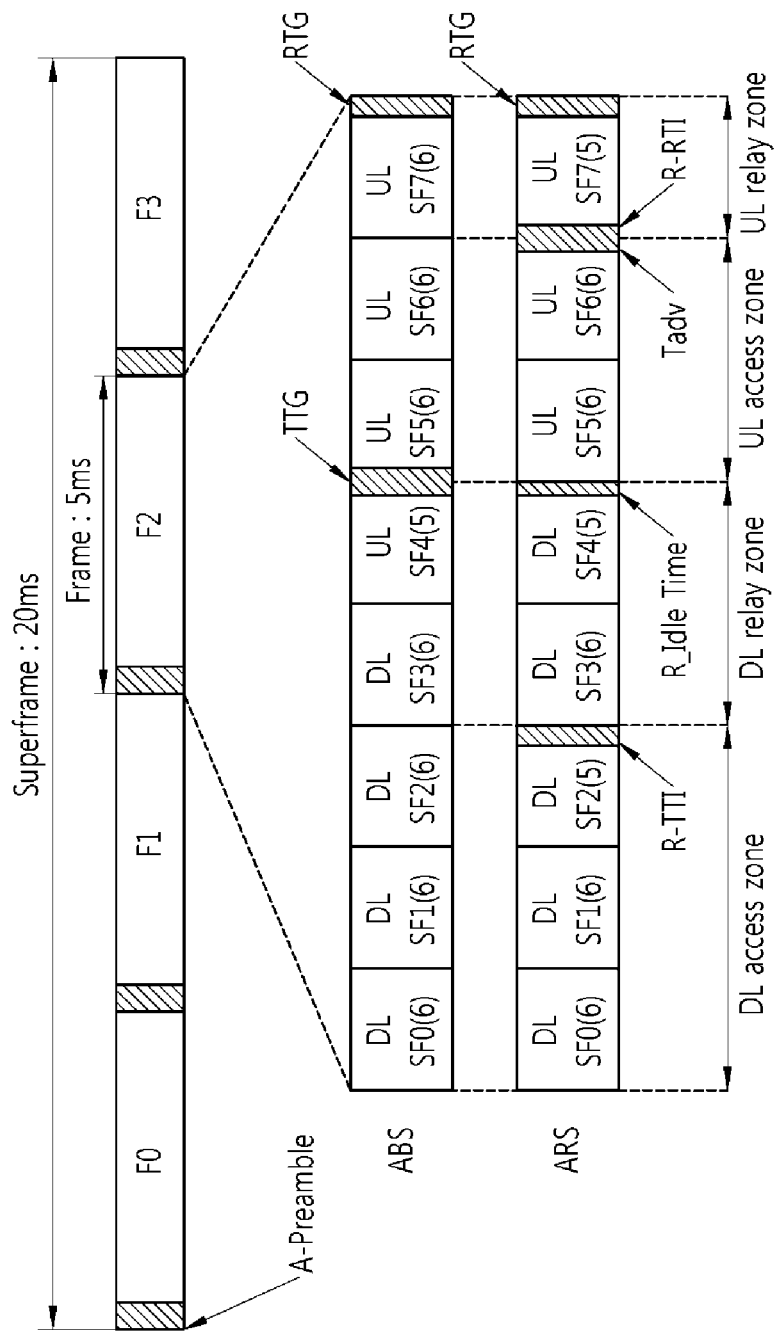
FIG. 6 shows an example of a TDD frame configuration of a system supporting an RS.

FIG. 6 shows an example of a TDD frame configuration of a system supporting an RS.

FIG. 6 shows an example of a TDD frame configuration applicable when a nominal channel bandwidth is 5 MHz, 10 MHz, or 20 MHz and G=1/8. A ratio of a DL frame and a UL frame is 5:3.

Referring to FIG. 6, an idle state time interval R_IdleTime is inserted before a switching point where the DL zone is switched to a UL zone. The length of the idle state time interval R_IdleTime may be signalized from an RS to an MS through an AAI_SCD message. An RS UL frame may be temporally ahead of a BS UL frame by Tadv. The length of the idle state time interval R_IdleTime may be identical with or smaller than a TTG. Furthermore, in each RS radio frame, an RTG is inserted before a switching point where the UL zone is switched to the DL zone.

Furthermore, referring to FIG. 6, the RS frame of the TDD system has an R-TTI between the access zone and the relay zone in the DL zone. The RS frame of the TDD system has the R-RTI between the access zone and the relay zone in the UL zone.

A control channel for transmitting a control signal or a feedback signal is described below. The control channel can be used to transmit various kinds of control signals for communication between a base station and a mobile station. The control channel described hereinafter can include an uplink control channel, a downlink control channel, and a fast feedback channel.

A control channel is designed by taking the following points into consideration.

(1) A plurality of tiles included in a control channel can be distributed over the time domain or the frequency domain in order to obtain a frequency diversity gain. For example, assuming that a DRU includes three tiles each including six consecutive subcarriers on six OFDM symbols, the control channel includes the three tiles, and each of the tiles can be distributed over the frequency domain or the time domain. In some embodiments, the control channel can include at least one tile including a plurality of mini-tiles, and the plurality of mini-tiles can be distributed over the frequency domain or the time domain. For example, the mini-tile can consist of (OFDM symbols×subcarriers)=6×6, 3×6, 2×6, 1×6, 6×3, 6×2, 6×1 or the like. Assuming that a control channel, including (OFDM symbols×subcarriers) of IEEE 802.16e=the tiles of a 3×4 PUSC structure, and a control channel, including mini-tiles, are multiplexed through a Frequency Division Multiplexing (FDM) method, the mini-tiles can consist of (OFDM symbols×subcarriers)=6×2, 6×1, etc. When taking only the control channel, including the mini-tiles, into consideration, the mini-tiles can consist of (OFDM symbols× subcarriers)=6×2, 3×6, 2×6, 1×6 or the like.

(2) To support a high-speed mobile station, the number of OFDM symbols constituting a control channel must be a minimum. For example, in order to support a mobile station moving at the speed of 350 km/h, the number of OFDM symbols constituting a control channel is properly 3 or less.

(3) The transmission power of a mobile station per symbol is limited. To increase the transmission power of a mobile station per symbol, it is advantageous to increase the number of OFDM symbols constituting a control channel. Accordingly, a proper number of OFDM symbols has to be determined with consideration taken of (2) a high-speed mobile station and (3) the transmission power of a mobile station per symbol.

(4) For coherent detection, pilot subcarriers for channel estimation have to be uniformly distributed over the time domain or the frequency domain. The coherent detection method is used to perform channel estimation using a pilot and then find data loaded on data subcarriers. For the power boosting of pilot subcarriers, the number of pilots per OFDM symbol of a control channel has to be identical in order to maintain the same transmission power per symbol.

(5) For non-coherent detection, a control signal has to consist of orthogonal codes/sequences or semi-orthogonal codes/sequences or has to be spread.

Examples of the uplink control channel used in the IEEE 802.16m system include a feedback channel comprising a fast feedback channel (FFBCH) and a hybrid automatic repeat request (HARQ) feedback control channel (HFBCH), a sounding channel, a ranging channel, a bandwidth request channel (BRCH), etc. Information such as a channel quality indicator (CQI), a multiple-input multiple-output (MIMO) feedback, an acknowledgement/non-acknowledgement (ACK/NACK), an uplink synchronization signal, a bandwidth request, etc. may be transmitted over the uplink control channel.

A BRCH is used to request radio resources for sending UL data or for sending a control signal by the MS. Bandwidth Request (BR) information is transmitted in a contention-based random access way on the BRCH. The BRCH includes resources used by an MS in order to send a BR preamble sequence and an additional quick access message. The BRCH may consist of BR tiles.

Figure 7:
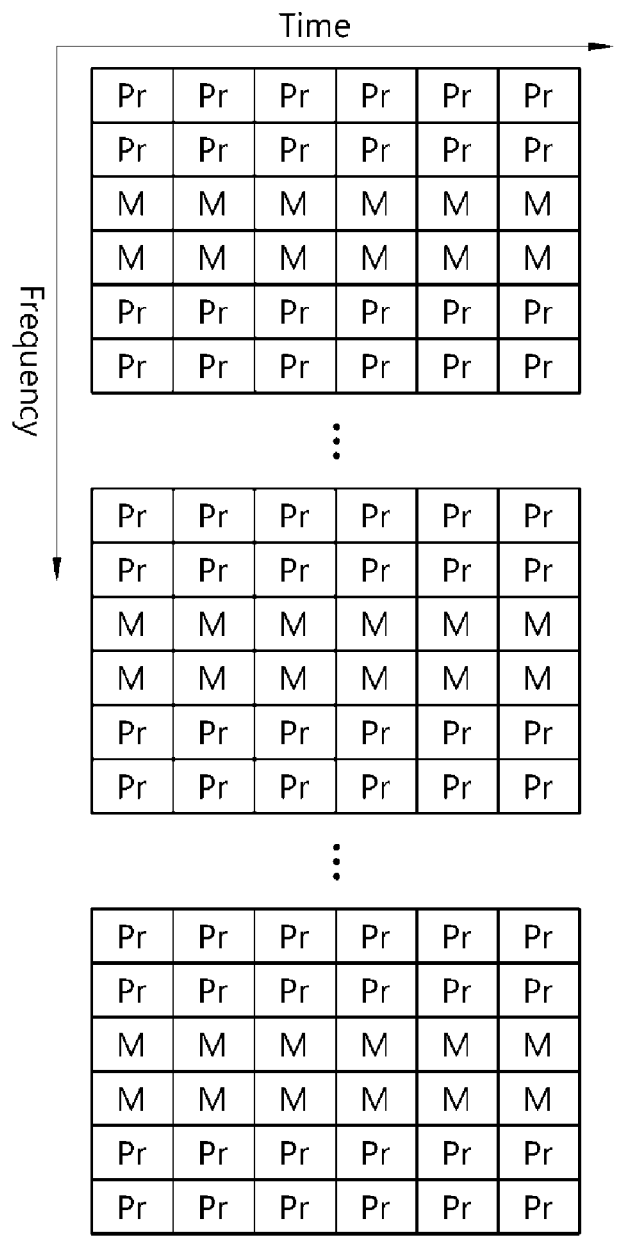
FIG. 7 shows an example of a BR tile structure.

FIG. 7 shows an example of a BR tile structure.

Referring to FIG. 7, the BR tile may be defined by 6 contiguous subcarriers and 6 OFDMA symbols. Each BRCH includes 3 distributed BR tiles for frequency diversity. The BR tile consist of a preamble part (Pr) and a data part (M). The preamble part may send the BR preamble on resources, including 6 OFDMA symbols and 4 subcarriers. The data part may send the quick access message on resources, including 6 OFDMA symbols and 2 contiguous subcarriers. An MS may send only the BR preamble, but leave resources for the quick access message without using the resources. An MS may determine whether to send only the BR preamble or send both the BR preamble sequence and the quick access message.

An MS may perform a contention-based BR using the BR preamble and the additional quick access message, transmitted on the BRCH, or a standalone BR transmitted through a BR signaling header. Each BRCH may indicate one BR opportunity. In general, a bandwidth request may be performed through a 3-step BR process or a 5-step BR process. The 3-step BR process is for performing faster bandwidth request, and the 5-step BR process is for performing a more stable contention-based bandwidth request. Whether a bandwidth request will be performed through which BR process may be determined by a BS or an MS.

Figure 8:
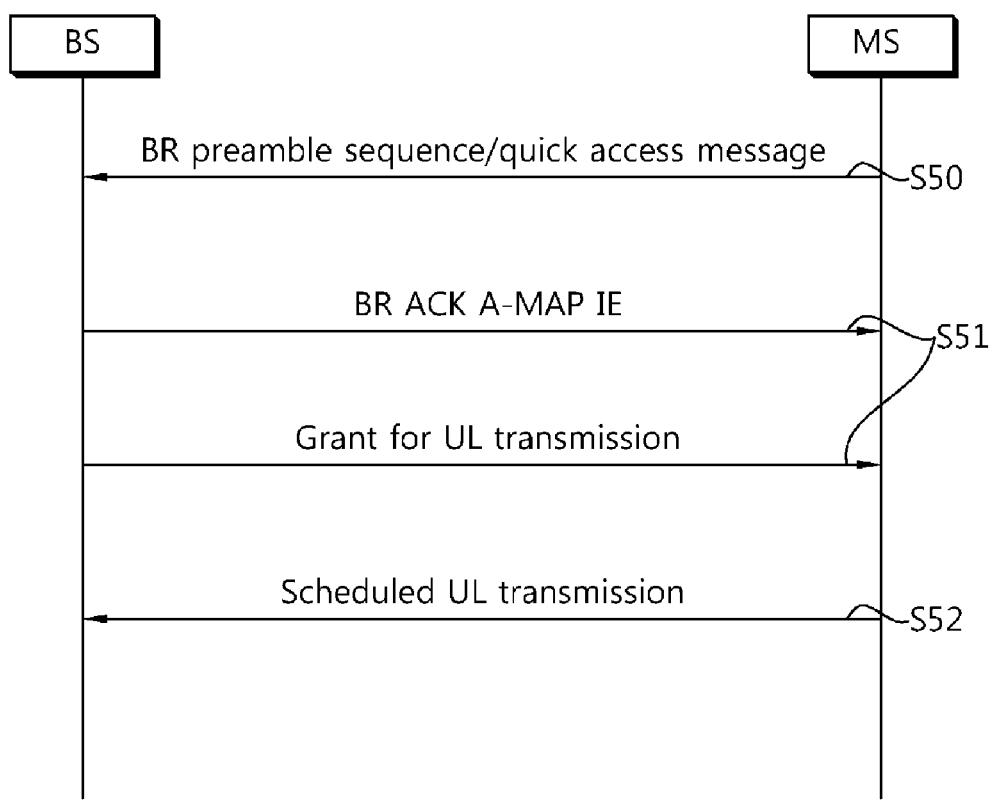
FIG. 8 shows an example of a 3-step BR process.

FIG. 8 shows an example of the 3-step BR process.

At step S50, an MS sends the BR preamble sequence and the quick access message to a BS on a randomly selected BRCH.

At step S51, the BS sends a grant for UL transmission to the MS. At this time, the BS may send ACK, indicating that the BR preamble sequence or the quick access message has been received, to the MS. In the transmission of ACK, if the BS detects at least one BR preamble sequence from among a plurality of BR opportunities of a frame n and the BS does not grant UL resources according to a CDMA_Allocation_IE or a UL basic assignment IE in response to all BRs within a frame n+BR_ACK_Offset or which have been successfully received previously, at least one BR-ACK A-MAP IE may be transmitted to the MS in the DL frame of the frame n+BR_ACK_Offset. Furthermore, the BS may send a plurality of BR-ACK A-MAP IEs in a subframe within the DL frame of the frame n+BR_ACK_Offset. Each BR-ACK A-MAP IE includes each bit map pertinent to the BR preamble sequence. After sending the BR preamble sequence, each MS attempts to decode all BR-ACK A-MAP IEs within the DL frame of the frame n+BR_ACK_Offset. If the BR-ACK A-MAP IE is not transmitted in the DL frame of the frame n+BR_ACK_Offset, but an MS does not receive any UL grant within the frame n+BR_ACK_offset or before, the MS may consider it as implicit NACK and perform the BR process from the beginning.

At step S52, the MS performs scheduled UL transmission.

Figure 9:
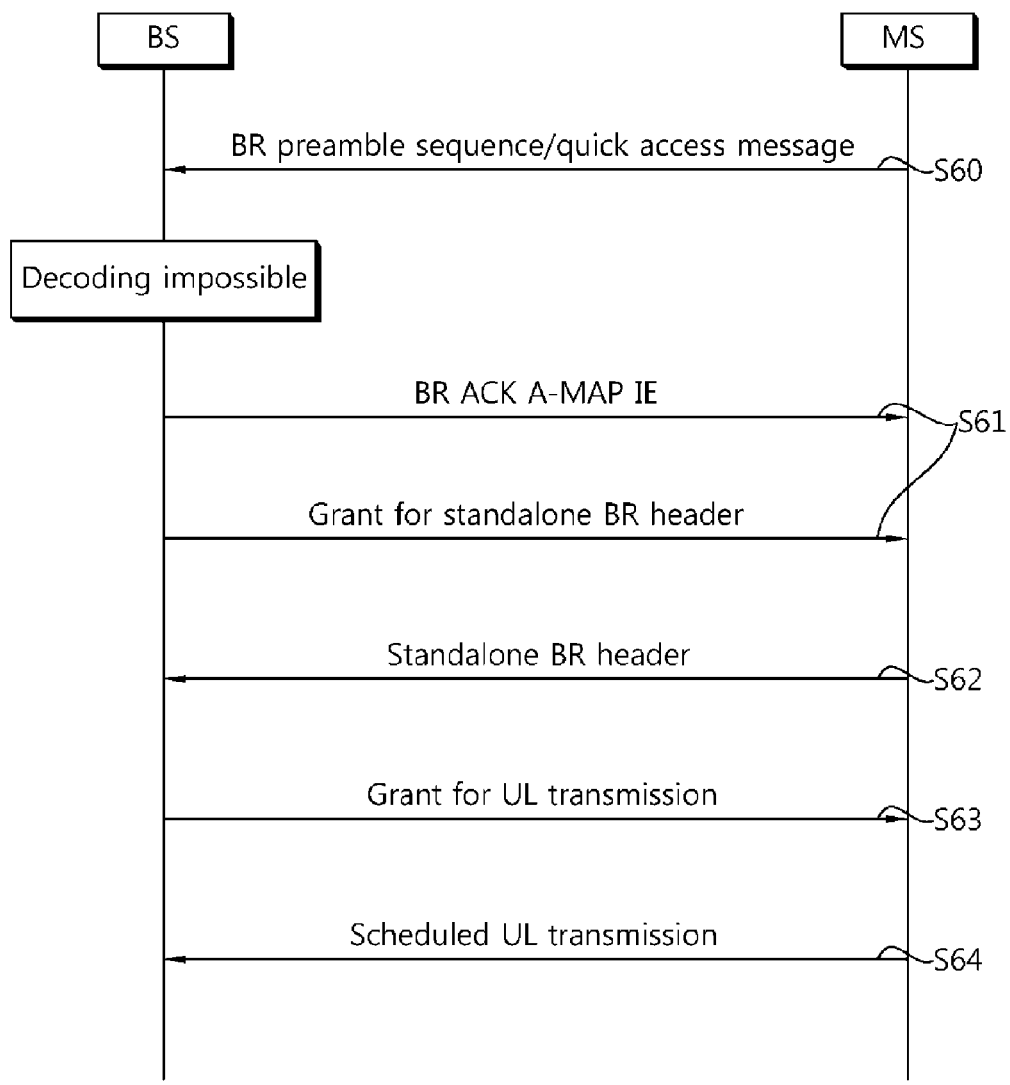
FIG. 9 shows an example of a 5-step BR process.

FIG. 9 shows an example of the 5-step BR process. In the 3-step BR process, if the BS does not decode the BR preamble sequence or the quick access message, the 5-step BR process may be performed.

At step S60, an MS sends a BR preamble sequence to a BS. At this time, a quick access message may be additionally transmitted.

If the BS does not decode the BR preamble sequence or the quick access message, the BS provides an UL grant to the MS using BR ACK A-MAP IE or CDMA allocation A-MAP IE at step S61. The UL grant may be for a standalone BR header.

At step S62, the MS sends only a standalone BR header to the BS.

At step S63, the BS sends a grant for UL transmission to the MS.

At step S64, the MS performs scheduled UL transmission.

The above 5-step BR process may be performed independently or may be performed as a substitute BR process when the 3-step BR process of FIG. 8 is failed. In the 5-step BR process, after an MS sends a standalone BR header to a BS, a BR timer may be started. A value of the BR timer may be set to a value of a differentiated BR timer obtained during a DSx processing process. Furthermore, even in the 5-step BR process, an MS may send only the BR preamble sequence. In response thereto, a BS may send ACK, indicating that the BR preamble sequence has been received, to the MS. In the transmission of ACK, if a BS detects at least one BR preamble sequence from a plurality of BR opportunities of a frame n and a BS does not grant UL resources according to a CDMA allocation IE or a UL basic assignment IE in response to all BRs within a frame n+BR_ACK_Offset or which have been successfully received previously, at least one BR-ACK A-MAP IE may be sent to the MS in the DL frame of the frame n+BR_ACK_Offset.

When the BR is granted, the BS may allocate resources to the MS through the CDMA allocation A-MAP IE. The BS may allocate UL resources to a user which has requested the relevant bandwidth through the CDMA allocation A-MAP IE. Here, the CDMA allocation A-MAP IE may be masked through cyclic redundancy checking (CRC) and transmitted because the BS does not know which MS has made the BR. CRC of 16 bits may be generated based on the contents of a randomized CDMA allocation A-MAP IE and masked. The CRC masked in 16 bits may consist of a masking prefix of 1 bit, a message type indicator of 3 bits, and a masking code of 12 bits. Table 2 shows an example of CRS masked in 16 bits.

TABLE 2

| Masking Prefix (1 bit MSB) | Remaining 15 bit LSBs | |
| --- | --- | --- |
| | Type Indicator | Masking Code |
| 0b0 | 0b000 | 12 bit STID or TSTID |
| 0b1 | 0b001 | 15 bit RA-ID: The RA-ID is derived from the AMS' random access attributes (i.e., a superframe number (LSB 5 bits), a frame_index (2 bits), a preamble code index for ranging or BR (6 bits) and an opportunity index for ranging or BR (2 bits)) as defined below: RA-ID = (LSB 5 bits of superframe number \| frame_index \| preamble_code_index \| opportunity_index) |

Referring to Table 2, when the masking prefix is 1, the remaining 15 bits of masked CRC may represent a Random Access Identifier (RA-ID). In the BR process, the RA-ID may consist of a superframe number (5 bits), a frame index (2 bits), a preamble code index (6 bits) for a BR, and a BR opportunity index (2 bits).

Meanwhile, a maximum of four BRCHs can be allocated within one frame. The BRCHs sequentially obtain a BR opportunity. Table 3 shows an example of a field within a S-SFH SP3 indicating information to which BRCHs are allocated.

TABLE 3

| Syntax | Size (bit) | Notes |
| --- | --- | --- |
| UL BR channel information | 3 | Indicates the number and the location of UL AAI subframe where the UL BR channel is allocated. The maximum number of UL BR channel in a frame is four.<br>0b000: First UL AAI subframe in the first frame in every superframe<br>0b001: First UL AAI subframe in the first and second frame in every superframe<br>0b010: First UL AAI subframe in every frame |

TABLE 3-continued

| Syntax | Size (bit) | Notes |
| --- | --- | --- |
| | | 0b011: First 2 UL AAI subframe in every frame<br>0b100: First 4 UL AAI subframe in every frame<br>0b101~111: reserved<br>When frame configuration is supporting the WirelssMAN-OFDMA with FDM based uplink PUSC zone, 0b100 shall not be supported. |
| BR backoff start | 4 | Initial backoff window size for contention BRs, expressed as a power of 2. Values of n range 0~15 (the highest order bits shall be unused and set to 0) |
| BR backoff end | 4 | Final backoff window size for contention BRs, expressed as a power of 2. Values of n range 0~15 |

Referring to Table 3, a UL BRCH information field within the S-SFH SP3 indicates the number of allocated BRCHs and the position where the BRCH is allocated in the time domain. The number of BRCHs that can be allocated within a frame is a maximum of 4. The BRCHs can be allocated from the UL subframe of the first part within the frame, irrespective of how many BRCHs are allocated.

Meanwhile, in a system into which an RS has been introduced, the allocation of the BRCHs for an RS has not yet been discussed. The BRCHs may be allocated to both the UL access zone and the UL relay zone. However, if the BRCHs are allocated to the UL relay zone and the UL subframe of the UL relay zone to which the BRCH has been allocated includes a transition gap (i.e., R-RTI), an RS is unable to send data in the first one OFDMA symbol. Since a punctured BRCH is transmitted, orthogonality is broken. Accordingly, BRCHs for the RS may be separately required.

Meanwhile, one BRCH or a maximum of four BRCHs may be consecutively allocated from the first subframe. Accordingly, if BRCHs for an RS are separately allocated to the UL relay zone, a problem may arise when 0 to 3 opportunity indices are allocated. Even though the BRCHs for the RS are separately allocated to the relay zone, the existing opportunity indices 0 to 3 must be used because assigning a new opportunity index may have an adverse effect on the system. For example, four BRCHs having opportunity indices 0 to 3 may be allocated to the UL access zone, and BRCHs for an RS, having an opportunity index 0, may be separately allocated to the UL relay zone. In this case, if a BS allocates resources through the CDMA allocation A-MAP IE based on the opportunity indices, a problem arises because whether the relevant opportunity index indicates the BRCH allocated to the UL access zone or the BRCH allocated to the UL relay zone is vague.

Figure 10:
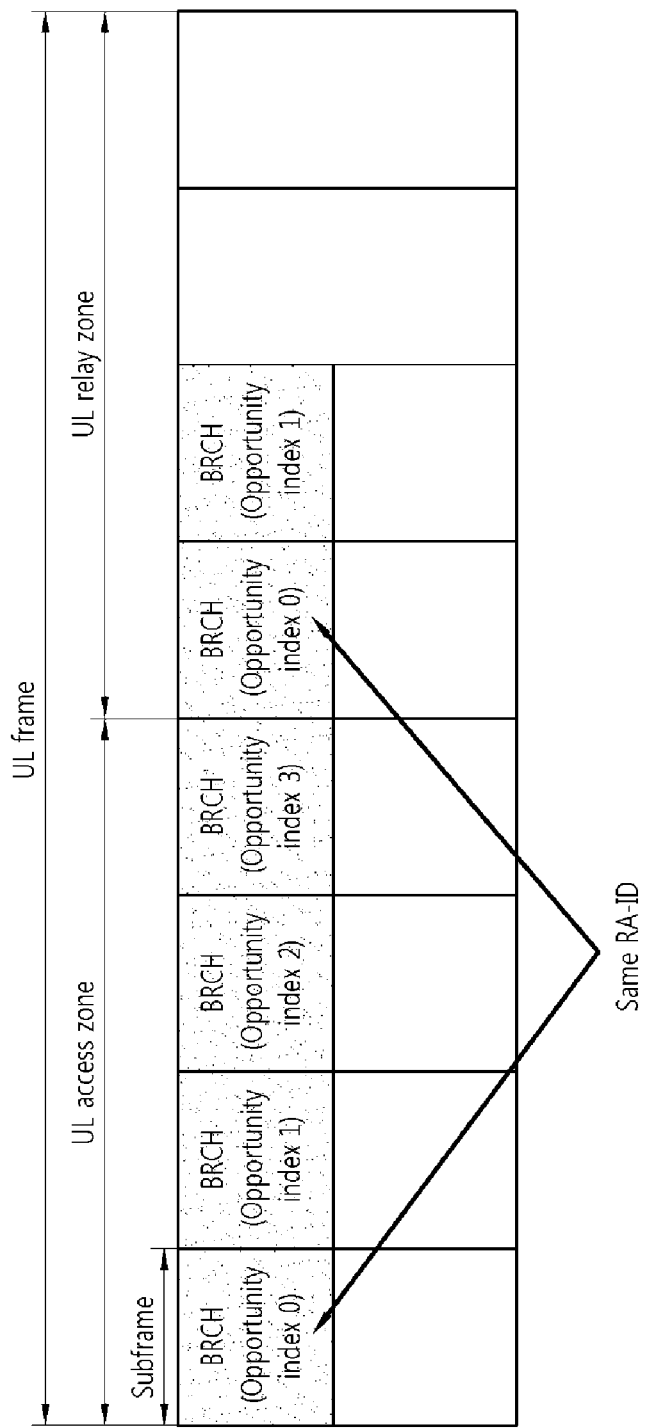
FIG. 10 shows an example in which opportunity indices overlap with each other when BRCHs for an RS are separately allocated.

FIG. 10 shows an example in which opportunity indices overlap with each other when BRCHs for an RS are separately allocated.

Referring to FIG. 10, an UL frame including 8 subframes consists of a UL access zone, including 4 subframes, and a UL relay zone including 4 subframes. 4 BRCHs are allocated to the 4 subframes included in the UL access zone, respectively, and are assigned opportunity indices 0 to 3 from the first BRCH. Furthermore, BRCHs for an RS are separately allocated to the UL relay zone. The BRCHs for the RS are allocated to the first and the second subframes of the UL relay zone and are assigned opportunity indices 0 and 1. Accordingly, the opportunity indices of the BRCHs, allocated to the UL access zone, and the BRCHs allocated to the UL relay zone overlap with each other. Consequently, confusion occurs when a BS allocates bandwidths.

In order to solve the confusion problem, there is a need for a new method of allocating BRCHs in a system into which an RS has been introduced.

Figure 11:
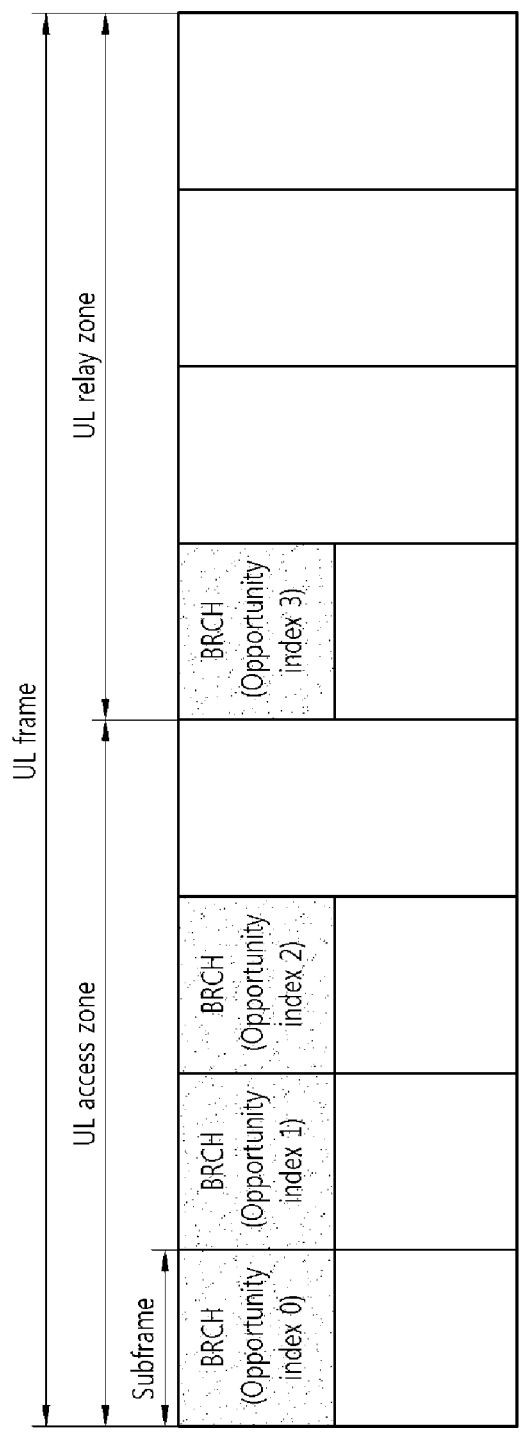
FIG. 11 shows an example in which BRCHs have been allocated to a UL access zone and a UL relay zone according to a proposed method of allocating the BRCHs.

FIG. 11 shows an example in which BRCHs have been allocated to the UL access zone and the UL relay zone according to a proposed BRCH allocation method.

Referring to FIG. 11, when BRCHs are allocated in a system into which an RS has been introduced, a maximum 4 of BRCHs may be allocated to the UL access zone and the UL relay zone. Here, the opportunity indices of the BRCHs are assigned with the UL access zone and the UL relay zone integrated. That is, the maximum number of opportunity indices within one frame cannot exceed 4. In FIG. 11, 3 BRCHs are allocated to a UL access zone, and one BRCH is allocated to a UL relay zone. The opportunity indices of the BRCHs allocated to the UL access zone are 0 to 2, and the opportunity index of the BRCH allocated to the UL relay zone is 3. The opportunity indices of the BRCHs allocated to the UL access zone do not overlap with the opportunity index of the BRCH allocated to the UL relay zone. If the RA-IDs of masked CRC bits may be separated from each other and an MS and a BS can communicate with each other in the UL relay zone, there is an advantage in that the BRCHs allocated to the UL relay zone may be used by the MS.

BRCHs for an RS, allocated according to the proposed invention, may be separated from BRCHs for an MS connected to a BS and transmitted. Information about the allocation of the BRCHs for the RS may be defined by an RS configuration command message (or AAI-ARS-CONFING-CMD message). If BRCHs for an MS connected to a BS and BRCHs for an RS are synchronously allocated within a frame, the opportunity indices of the BRCHs for the RS may be started after the opportunity indices of the BRCHs for the MS connected to the BS. The BRCHs for the MS connected to the BS, as described above, may be allocated by the S-SFH SP3. Table 4 shows an example of the RS configuration command message including information about the allocation of BRCHs for an RS.

Referring to Table 4, a UL BR information field within the RS configuration command message indicates the number of subframes to which BRCHs for an RS are allocated and the positions where the subframes are allocated. If an R-RTI is inserted into an UL relay zone, the BRCHs for the RS are allocated from the second subframe of the UL relay zone. If the R-RTI is not inserted into the UL relay zone, the BRCHs for the RS are allocated from the first subframe of the UL relay zone. A UL BR allocation field within the RS configuration command message indicates the Distributed Resource Unit (DRU) indices of the frequency domain to which BRCHs for an RS are allocated within a frequency partition.

Meanwhile, in order to minimize influence on an MS connected to a BS without communicating with an RS, BRCHs for the MS connected to the BS are allocated by the S-SFH SP3, as in the existing technology. However, a UL BR channel information field within the S-SFH SP3, indicating the number of subframes to which the BRCHs are allocated according to the proposed invention and the positions where the subframes are allocated may be modified as in Table 5.

TABLE 5

| Syntax | Size (bit) | Notes |
|---|---|---|
| UL BR channel information | 3 | Indicates the number and the location of UL AAI subframe where the UL BR channel is allocated. The maximum number of UL BR channel in a frame is four.<br>0b000: First UL AAI subframe in the first frame in every superframe<br>0b001: First UL AAI subframe in the first and second frame in every superframe<br>0b010: First UL AAI subframe in every frame<br>0b011: First 2 UL AAI subframe in every frame<br>0b100: First 3 UL AAI subframe in every frame<br>0b101: First 4 UL AAI subframe in every frame<br>0b110~111: reserved |

TABLE 4

| Field | Size (bits) | Value/Description | Condition |
|---|---|---|---|
| UL BR channel information | 2 | Indicates the number and the location of UL AAI subframe where the UL BR channel is allocated.<br>0b000: $i^{th}$ UL AAI subframe of UL relay zone in the first frame in every superframe<br>0b001: $i^{th}$ UL AAI subframe of UL relay zone in the first and second frame in every superframe<br>0b010: $i^{th}$ UL AAI subframe of UL relay zone in every frame<br>0b011: $i^{th}$ and $(i + 1)^{th}$ UL AAI subframe of UL relay zone in every frame<br>Where $i^{th}$ is 'first' if UL the R-RTI = 0, and $i^{th}$ is 'second' if UL the R-RTI = Ts. | The opportunity index starts next to the UL BR channels defined in the SFH SP3 when the frame allocated the UL BR channel(s) for ARS has UL BR channel(s) defined in an S-SFH SP3. |
| UL BR channel allocation | 4 | The DRU index for UL BR REQ channel within FPi defined by 'Frequency partition location for UL control channels' in an S-SFH SP1. | |
| BR backoff start | 4 | Initial backoff window size for contention BRs, expressed as a power of 2. Values of n range 0~15 (the highest order bits shall be unused and set to 0) | |
| BR backoff end | 4 | Final backoff window size for contention BRs, expressed as a power of 2. Values of n range 0~15 | |

Referring to Table 5, BRCHs for an MS connected to a BS may also be allocated to the first 3 subframes of each frame in a UL access zone. If three BRCHs for an MS connected to a BS are allocated to a UL access zone, a maximum of 1 BRCH for an RS may be allocated to a UL relay zone.

Figure 12:
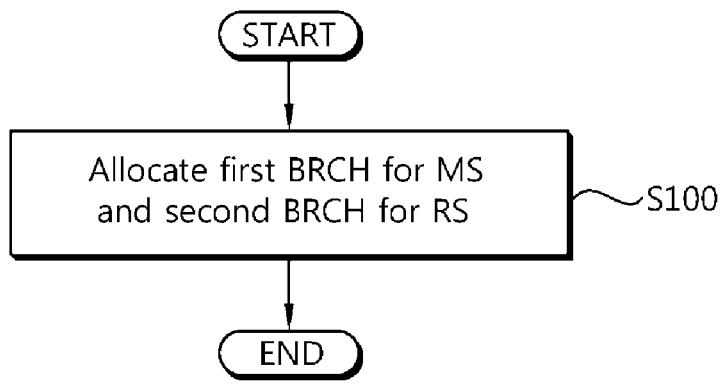
FIG. 12 shows an embodiment of a proposed method of allocating a BRCH.

FIG. 12 shows an embodiment of a proposed method of allocating a BRCH.

Referring to FIG. 12, at step S100, a BS allocates at least one first BRCH for the bandwidth request of an MS connected to the BS and at least one second BRCH for the bandwidth request of an RS. Here, an opportunity index is assigned to each of the at least one first BRCH and the at least one second BRCH, and the opportunity index assigned to the at least one second BRCH is started after the opportunity index assigned to the at least one first BRCH.

Figure 13:
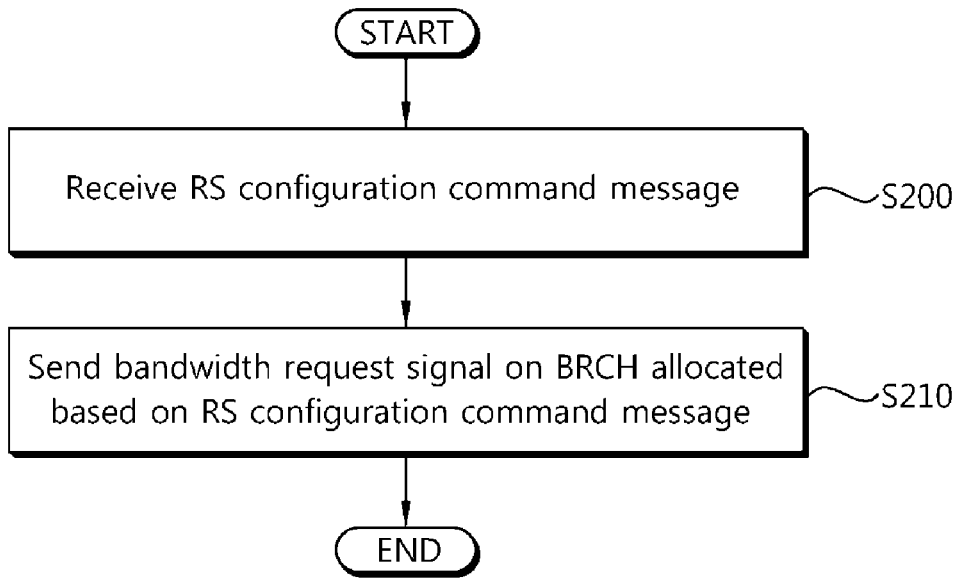
FIG. 13 shows an embodiment of a proposed method of sending a bandwidth request signal.

FIG. 13 shows an embodiment of a proposed method of sending a bandwidth request signal.

Referring to FIG. 13, at step S200, an RS receives an RS configuration command message from a BS. At step S210, the RS sends a bandwidth request signal to the BS through at least one RS BRCH, allocated for the bandwidth request of the RS, based on the RS configuration command message. The at least one RS BRCH is allocated to a UL relay zone within a frame which is used by the RS to send a signal to the BS. An opportunity index is allocated to the at least one RS BRCH. The opportunity index assigned to the at least one RS BRCH is started after the opportunity index of an at least one MS BRCH allocated to a UL access zone for the bandwidth request of an MS connected to the BS.

Figure 14:
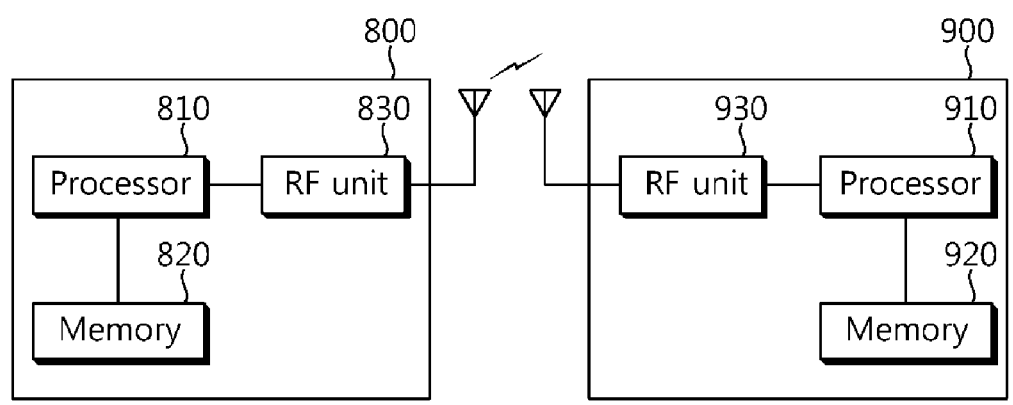
FIG. 14 is a block diagram of a wireless communication system in which the embodiments of the present invention are implemented.

FIG. 14 is a block diagram of a wireless communication system in which the embodiment of the present invention is implemented.

The BS 800 includes a processor 810, memory 820, and a Radio Frequency (RF) unit 830. The processor 810 implements the proposed functions, processes, and/or methods. The layers of a radio interface protocol may be implemented by the processor 810. The processor 810 allocates at least one first BRCH for the bandwidth request of an MS connected to the BS 800 and at least one second BRCH for the bandwidth request of an RS. Here, an opportunity index is assigned to each of the at least one first BRCH and the at least one second BRCH. The opportunity index assigned to the at least one second BRCH is started after the opportunity index assigned to the at least one first BRCH. The memory 820 is connected to the processor 810 and configured to store various pieces of information for driving the processor 810. The RF unit 830 is connected to the processor 810 and configured to communicate with an RS or an MS.

An RS 900 includes a processor 910, memory 920, and an RF unit 930. The processor 910 implements the proposed functions, processes, and/or methods. The layers of a radio interface protocol may be implemented by the processor 910. The processor 910 receives an RS configuration command message from a BS and sends a bandwidth request signal to the BS through at least one RS BRCH, allocated for the bandwidth request of the RS 900, based on the RS configuration command message. Here, the at least one RS BRCH is allocated to a UL relay zone within a frame, which is used by the RS in order to send a signal to the RS. An opportunity index is allocated to the at least one RS BRCH. The opportunity index assigned to the at least one RS BRCH may be started after the opportunity index of at least one MS BRCH allocated to a UL access zone for the bandwidth request for an MS connected to a BS. The memory 920 is connected to the processor 910 and configured to store various pieces of information for driving the processor 910. The RF unit 930 is connected to the processor 910 and configured to send or receive a radio signal or send and receive a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

The aforementioned embodiments include various exemplary aspects. Although all possible combinations for representing the various aspects cannot be described, it will be understood by those skilled in the art that other combinations are also possible. Therefore, all replacements, modifications, and changes should fall within the spirit and scope of the claims of the present invention.

The invention claimed is:

1. A method of allocating a bandwidth request channel (BRCH) in a wireless communication system including a relay station (RS), the method comprising:
    allocating at least one first BRCH for a bandwidth request of a mobile station (MS) connected to a base station (BS) and at least one second BRCH for a bandwidth request of the RS,
    wherein an opportunity index is assigned to each of the at least one first BRCH and the at least one second BRCH, and
    the opportunity index assigned to the at least one second BRCH is started after the opportunity index assigned to the at least one first BRCH,
    wherein the at least one second BRCH is allocated by an RS configuration command message through media access control (MAC).

2. The method of claim 1, wherein:
    the at least one first BRCH is allocated to a uplink (UL) access zone used by the RS in order to receive a signal from the MS, and
    the at least one second BRCH is allocated to a UL relay zone used by the RS in order to send a signal to the BS.

3. The method of claim 1, wherein a total number of the at least one first BRCH and the at least one second BRCH is 4.

4. The method of claim 1, wherein:
    the opportunity index assigned to each of the first BRCH and the second BRCH is any one of 0 to 3, and
    the opportunity indices assigned to the first BRCH and the second BRCH do not overlap with each other.

5. The method of claim 1, wherein the RS configuration command message indicates the number and positions of UL subframes to which the at least one second BRCH is allocated.

6. The method of claim 5, wherein the at least one second BRCH is allocated from a first UL subframe or a second UL subframe of a UL relay zone.

7. The method of claim 1, wherein the RS configuration command message indicates an index of a distributed resource unit (DRU) in which the at least one second BRCH is allocated within a frequency partition.

8. The method of claim 1, wherein the at least one first BRCH is allocated by a secondary superframe header (S-SFH) SP3.

9. A method of sending a bandwidth request signal by a relay station (RS) in a wireless communication system including the RS, the method comprising:
receiving an RS configuration command message from a base station (BS), and
sending the bandwidth request signal to the BS through at least one RS BRCH, allocated for the bandwidth request of the RS, based on the RS configuration command message,
wherein the at least one RS BRCH is allocated to a UL relay zone within a frame, used by the RS in order to send a signal to the BS,
an opportunity index is allocated to the at least one RS BRCH, and
the opportunity index allocated to the at least one RS BRCH is started after an opportunity index of at least one MS BRCH allocated to a UL access zone for a bandwidth request of an MS connected to the BS.

10. The method of claim 9, wherein a total number of the at least one RS BRCH and the at least one MS BRCH is 4.

11. The method of claim 9, wherein:
the opportunity index assigned to each of the RS BRCH and the MS BRCH is any one of 0 to 3, and
the opportunity indices assigned to the RS BRCH and the MS BRCH do not overlap with each other.

12. The method of claim 9, wherein the at least one RS BRCH is allocated according to an RS configuration command message transmitted through MAC.

13. The method of claim 12, wherein the RS configuration command message indicates the number and positions of UL subframes to which the at least one RS BRCH is allocated.

14. The method of claim 12, wherein the RS configuration command message indicates an index of a DRU in which the at least one RS BRCH is allocated within a frequency partition.

15. The method of claim 9, wherein the at least one MS BRCH is allocated by an S-SFH SP3.

16. A relay station (RS) in a wireless communication system, the RS comprising:
a radio frequency (RF) unit configured to send or receive a radio signal; and
a processor connected to the RF unit,
wherein the processor is configured to:
receive an RS configuration command message from a BS, and
send a bandwidth request signal to the BS through at least one RS BRCH, allocated for the bandwidth request of the RS, based on the RS configuration command message,
wherein the at least one RS BRCH is allocated to a UL relay zone within a frame, used by the RS in order to send a signal to the BS,
an opportunity index is allocated to the at least one RS BRCH, and
the opportunity index allocated to the at least one RS BRCH is started after an opportunity index of at least one MS BRCH allocated to a UL access zone for a bandwidth request of an MS connected to the BS.

* * * * *